(12) United States Patent
Chitu et al.

(10) Patent No.: US 10,969,313 B2
(45) Date of Patent: Apr. 6, 2021

(54) FIXTURE FOR TESTING THE SHEAR PERFORMANCE OF MICROCELLULAR-FOAMED THERMOPLASTIC COMPOSITE WELDS

(71) Applicant: Magna Exteriors Inc., Concord (CA)

(72) Inventors: Marius Chitu, Concord (CA); Alexis Baltazar y Jimenez, Concord (CA); Steven J. Mori, Aurora (CA); Keith Ward, Richmond Hill (CA)

(73) Assignee: Magna Exteriors Inc., Concord (CA)

( * ) Notice: Subject to any disclaimer, the term of this patent is extended or adjusted under 35 U.S.C. 154(b) by 192 days.

(21) Appl. No.: 16/308,710

(22) PCT Filed: Jun. 8, 2017

(86) PCT No.: PCT/IB2017/053400
§ 371 (c)(1),
(2) Date: Dec. 10, 2018

(87) PCT Pub. No.: WO2017/212440
PCT Pub. Date: Dec. 14, 2017

(65) Prior Publication Data
US 2019/0178763 A1 Jun. 13, 2019

Related U.S. Application Data

(60) Provisional application No. 62/348,264, filed on Jun. 10, 2016.

(51) Int. Cl.
*G01N 3/04* (2006.01)
*G01N 3/08* (2006.01)
*G01N 3/24* (2006.01)

(52) U.S. Cl.
CPC ............ *G01N 3/04* (2013.01); *G01N 3/08* (2013.01); *G01N 3/24* (2013.01); *G01N 2203/0296* (2013.01)

(58) Field of Classification Search
None
See application file for complete search history.

(56) References Cited

U.S. PATENT DOCUMENTS

| | | | |
|---|---|---|---|
| 5,597,959 A * | 1/1997 | Rice ...................... | G01N 3/00 73/850 |
| 5,696,328 A * | 12/1997 | Underwood ............ | G01N 3/04 269/234 |

(Continued)

FOREIGN PATENT DOCUMENTS

| | | |
|---|---|---|
| CN | 102645382 | 8/2012 |
| CN | 102706745 | 10/2012 |

(Continued)

OTHER PUBLICATIONS

Supplementary European Search Report from Application No. EP17809822 dated May 20, 2019.

(Continued)

*Primary Examiner* — Peter J Macchiarolo
*Assistant Examiner* — Jermaine L Jenkins
(74) *Attorney, Agent, or Firm* — Warn Partners, P.C.

(57) ABSTRACT

A lap shear test fixture and method of use to test the performance of the weld interface in welded thermoplastic composite parts such as infrared welded or resistive implant welded or adhesive bonded composite parts. The specimens to be tested are provided from production-ready parts with typical geometry. The test fixture has at least two aligned blocks with at least two lateral support blocks that operably hold the specimen including two welded substrates. The test is performed in compression-mode at a predetermined crosshead speed until the maximum load produced by a universal testing machine makes the weld interface between the two thermoplastic substrates fail in shear mode.

20 Claims, 2 Drawing Sheets

(56) References Cited

U.S. PATENT DOCUMENTS

| | | | |
|---|---|---|---|
| 6,216,531 B1 | 4/2001 | Zhou | |
| 7,793,553 B2* | 9/2010 | Lindeman | G01N 3/04 |
| | | | 73/856 |
| 8,069,733 B2* | 12/2011 | Han | G01N 3/08 |
| | | | 73/781 |
| 8,448,522 B2* | 5/2013 | Martin | G01N 3/04 |
| | | | 73/856 |
| 9,995,664 B2* | 6/2018 | Komine | G01N 3/08 |
| 10,048,181 B2* | 8/2018 | Aegerter | G01N 3/08 |
| 10,295,456 B2* | 5/2019 | Nishida | G01N 17/006 |
| 2002/0194931 A1* | 12/2002 | Iwai | B23K 26/244 |
| | | | 73/850 |
| 2003/0159520 A1 | 8/2003 | Canumalla | |
| 2014/0033820 A1* | 2/2014 | Wakayama | G01N 29/14 |
| | | | 73/587 |

FOREIGN PATENT DOCUMENTS

| | | |
|---|---|---|
| CN | 103499498 A | 1/2014 |
| GB | 2151798 A | 7/1985 |

OTHER PUBLICATIONS

Publication date of following document established by Internet Archive Wayback Machine: 1, 5, 15, 19 <https://web.archive.org/web/20170401000000*/http://www.wyomingtestfixtures.com/Products/i4.html> Block-Shear Strength of Adhesive Bonds (ASTM D 4501) by Wyoming Test Fixtures Inc., made public on Jul. 10, 2016 (Jul. 10, 2016), accessed on Oct. 1, 2017 (Oct. 1, 2017).
International Search Report for Application No. PCT/IB2017/053400, dated Oct. 16, 2017.

* cited by examiner

FIXTURE FOR TESTING THE SHEAR PERFORMANCE OF MICROCELLULAR-FOAMED THERMOPLASTIC COMPOSITE WELDS

CROSS-REFERENCE TO RELATED APPLICATIONS

This application is a National Stage of PCT International Application No. PCT/IB2017/053400, filed Jun. 8, 2017, which claims the benefit of U.S. Provisional Patent Application No. 62/348,264, filed Jun. 10, 2016. The disclosures of the above applications are incorporated herein by reference.

FIELD OF THE INVENTION

The present invention relates to a test fixture to test weld interface of infrared welded thermoplastic or resistive implant welded or adhesive bonded composite parts for vehicles and method regarding same.

BACKGROUND OF THE INVENTION

Typical technologies to join thermoplastic composites may include: adhesive bonding, mechanical fastening and welding. Common welding processes may include: ultrasonic, laser, infrared, high frequency and resistive implant welding, to mention a few. Because the welding process is governed by parameters such as: time, temperature and pressure, careful optimization of the welding parameters is required for each application, particularly to produce large, complex structures that cannot be manufactured in a single step.

The choice of process is affected by the material to be joined, the joint configuration, the strength of joint required, the process cost and speed, and the production volume. Welding processes rely on polymer melting at the welding interface which allows the interdiffusion of polymer chains to take place across the two adherends with a weld forming on cooling.

Typically, it is necessary to test the strength of the weld interface during material and process development. Testing requires of a reliable, repeatable and cost-efficient method to determine the effect of stress concentration, delamination, part geometry and thickness on the mechanical performance of the weld.

There are a number of ways to determine the maximum load that the weld can withstand without failure. The use of destructive test methods in shear, tension or compression mode may be used in conjunction with single and double-lap joint specimens, or by means of a block shear test fixture. Nevertheless, these methods usually require of test specimens with specific geometry and mechanical performance, which may not always be available in a real production-ready part.

Thus, validating a full-size part for quality and performance is challenging, particularly in the automotive industry where welding microcellular-foamed thermoplastic composites is becoming a new trend.

Traditional vehicle liftgate geometry is complex, for example. This actually limits the shape, thickness and size of the specimens that can be cut out for testing the weld performance. Through a number of experiments, it has been found that the use of low surface energy adhesives in single lap-joint specimens requires a long curing cycle (usually 72 h at room temperature), and, typically, fail before producing weld failure, particularly if one of the thermoplastic substrates has very low mechanical performance. This is typically the case of microcellular-foamed thermoplastic composites. Excessive specimen warping and bending was found when a block shear fixture was used in combination with foamed-thermoplastic composites, which led to premature failure of the substrate, not of the weld interface.

One typical known test fixture is a block-shear test fixture designed to isolate the maximum load required to debond two materials with moduli higher than the modulus of the interface. This test fixture typically works well with IR-welded polymer substrates with tensile strength of at least 60 MPa and typical specimen geometry of approximately: 25.4×25.4 mm block bonded in the centre of a 3×3" block with thickness up to 12.7 mm. This kind of geometry is usually not available in production-ready parts, thus making the sampling and testing process challenging. Smaller test specimens are usually required.

The main limitation of this kind of test fixture is that it is not compatible with low tensile strength materials (<60 MPa), such is the case of microcellular-foamed thermoplastic composites, as the test specimens tend to warp and bend significantly during tesing.

It is therefore desired to have a simple, fast, accurate and repeatable test fixture to test the performance of the weld interface in infrared welded thermoplastic composite parts.

SUMMARY OF THE INVENTION

The present invention generally relates to a simple, fast, accurate and repeatable test fixture to test the performance of the weld interface in infrared (IR) welded thermoplastic composite parts such as liftgate or other automotive assemblies for vehicles. Particularly when one of the thermoplastic composites are microcellular-foamed and have low tensile strength (e.g., <25 MPa).

Specimens can be cut out from production-ready parts with typical geometry: e.g., 20×25 mm and thickness up to 3.0 mm. The weld interface in low tensile strength thermoplastic substrates, such as microcelluloar-foamed thermoplastic composites, can be tested in this way, thus making the test procedure simpler and faster to complete.

At least two rectangular steel blocks (Block 1 and Block 2) of a predetermined size (preferably, 60×25×9 mm) are operably machined down at one end to hold a specimen (preferably, of 20×25 mm and thickness up to 3 mm). Block 1 and Block 2 are aligned on each side to individual support blocks (preferably, having a maximum gap of 0.02 mm therebetween). The test is performed in compression-mode, typically at a predetermined crosshead speed (preferably of 1 mm/min) until the maximum load produced by the universal testing machine makes the weld interface between the two thermoplastic substrates fail in shear mode.

The present invention allows measuring the maximum load required to debond the weld interface between two microcellular-foamed thermoplastic composite substrates, having low tensile strength, in shear mode. Further, low energy surface adhesives are not required. In addition, because adhesive curing is not required, the test cycle is typically faster. Furthermore, only small specimens are required, and can be cut out from production-ready parts with predetermined thickness (preferably, between 3.0 and 1.0 mm).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
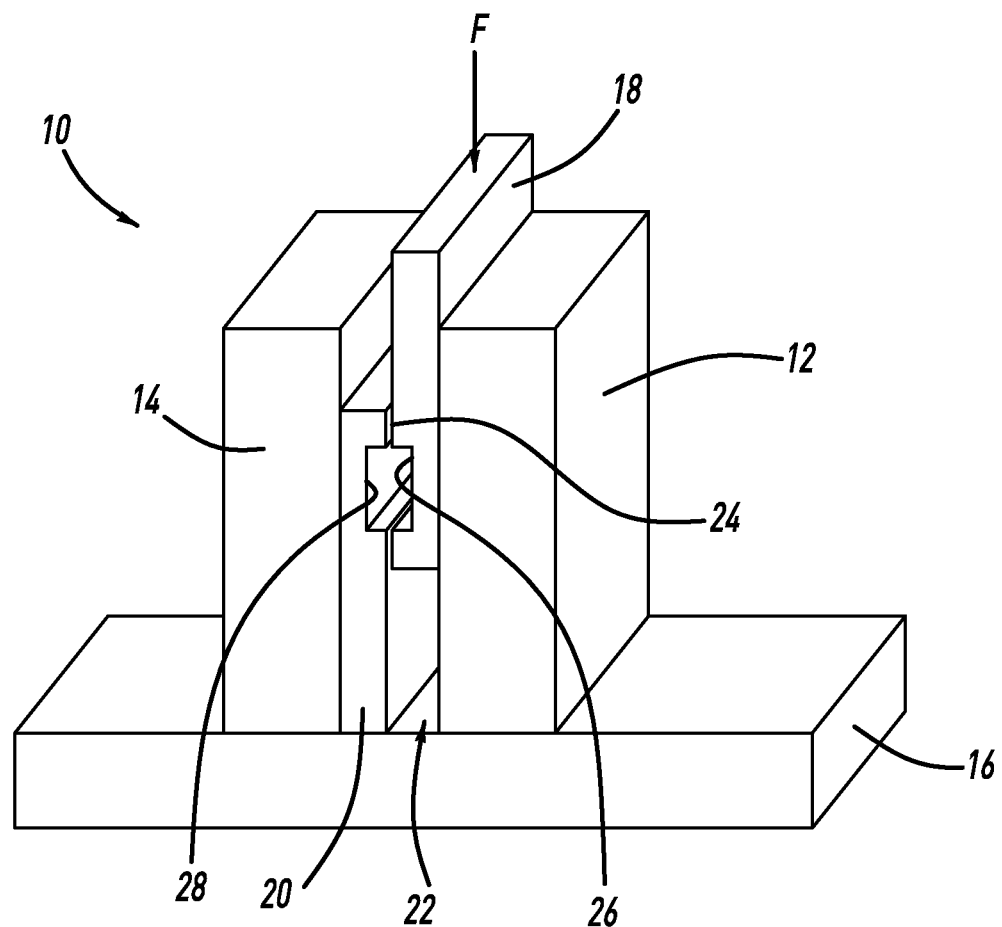
FIG. 1 is a perspective view of a test fixture, in accordance with one embodiment of the present invention.
Figure 2:
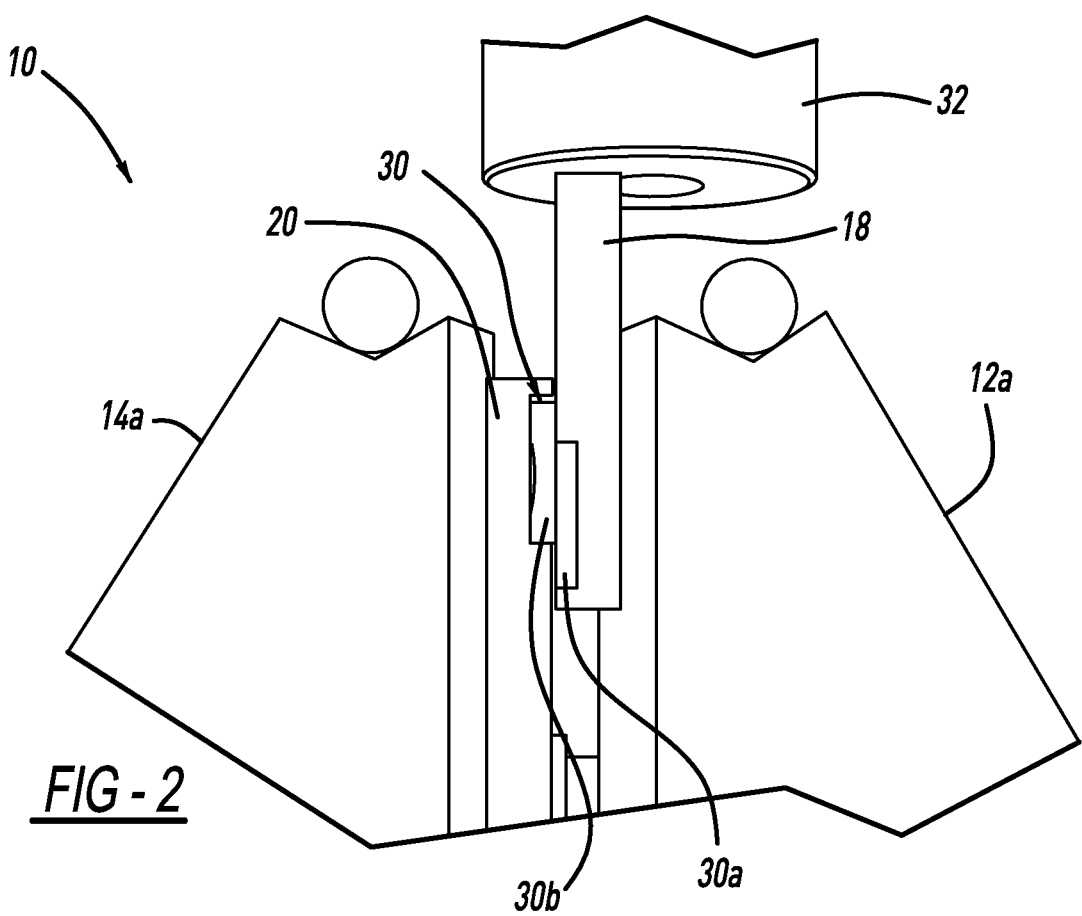
FIG. 2 is a front elevation view of a test fixture, in accordance with one embodiment of the present invention; and, FIG. 3 is a perspective view of a prior art block shear test fixture.

Referring to FIGS. 1-2 generally, in accordance with the present invention, there is provided a test fixture, shown generally at 10, comprising at least a first block 12 and an opposing second block 14 operably coupled to a base 16. The first and second blocks 12,14 are lateral support blocks. The first and second blocks 12,14 are generally rectangular, although any other suitable shape is within the scope of the present invention (e.g., first and second blocks 12a,14a depicted in FIG. 2). In a preferred embodiment, each block is about 60×25×9 millimeters (mm). The first and second blocks 12,14 are metal, most preferably, steel.

At least a first grip 18 (e.g., upper grip) and a second grip 20 (e.g., lower than the first grip) are also provided. The first and second blocks 12,14 are operably aligned on respective sides to the first and second grips 18,20 such that the first and second grips 18,20 are disposed in the space, generally indicated at 22, between the first and second blocks 12,14. There is a predetermined sized gap between the first and second grips 18,20, generally, about 0.001-0.02 mm, typically, about 0.015 mm, preferably, about 0.018, most preferably, a maximum gap of 0.02 mm.

A first channel 26 is provided in the first grip 18 and a second channel 28 is provided in the second grip 20 for holding a test sample or "specimen" (such as shown generally as 30 in FIG. 2) or "plaque" having at least two halves (a first substrate 30a and a second substrate 30b) with a weld interface at a predetermined location. Other shapes and configurations are contemplated without departing from the scope of the present invention. With the sample 30 loaded in the channels, 26,28, a load is then applied (e.g., downward, as indicated by arrow, "F") by a device 32 of a universal testing machine against a loading point, preferably, downward against the top of the higher first grip 18 when performing lap shear testing is desired. The test is performed in compression-mode, typically at a crosshead speed of 1 mm/min, until the maximum load produced by the universal testing machine makes the weld interface between the two thermoplastic substrates fail in shear mode.

The lap shear test fixture and method characterize the weld strength of foamed substrates with low tensile strength (<25 MPa). Failure of the weld line is repeatable. In addition, the test fixture has a compact design, which allows testing from production-ready parts.

In accordance with an embodiment of the present invention, the method for lap shear testing includes providing the test fixture 10 as described above. A predetermined sample 30 is prepared. By way of non-limiting example, foamed thermoplastic olefin (TPO) infrared welded plaques. The sample 30 is then operably loaded to the test fixture 10, and testing is performed. By way of example, the lap shear test method is DPPD20160419p (ASTM D4501 as reference, 25.4×20 mm, 1 mm/min).

Generally, the test is performed in compression-mode, typically at a crosshead speed of 1 mm/min, until the maximum load produced by the universal testing machine makes the weld interface between the two thermoplastic substrates fail in shear mode.

The present invention provides a simple, fast, accurate and repeatable test fixture to test the performance of the weld interface in IR-welded thermoplastic composite liftgates. Particularly when one of the thermoplastic composites is microcellular-foamed and has low tensile strength (such as <25 MPa). In addition, specimens 30 can be cut out from production-ready parts with typical geometry: such as 20×25 mm and thickness up to 3.0 mm. The weld interface in low tensile strength thermoplastic substrates, such as microcellular-foamed thermoplastic composites, can be tested in this way, thus making the test procedure simpler and faster to complete.

The present invention allows measuring the maximum load required to debond the weld interface between two microcellular-foamed thermoplastic composite substrates, having low tensile strength, in shear mode. In addition, Low energy surface adhesives are not required. In addition, because adhesive curing is not required, the test cycle is typically faster. In addition, only small specimens are required, and can be cut out from production-ready parts with thickness between 3.0 and 1.0 mm.

Any other joining processes other than IR welding, such as, but not limited to, RIW (resistive implant welding) are contemplated without departing from the scope of the present invention.

Figure 3:
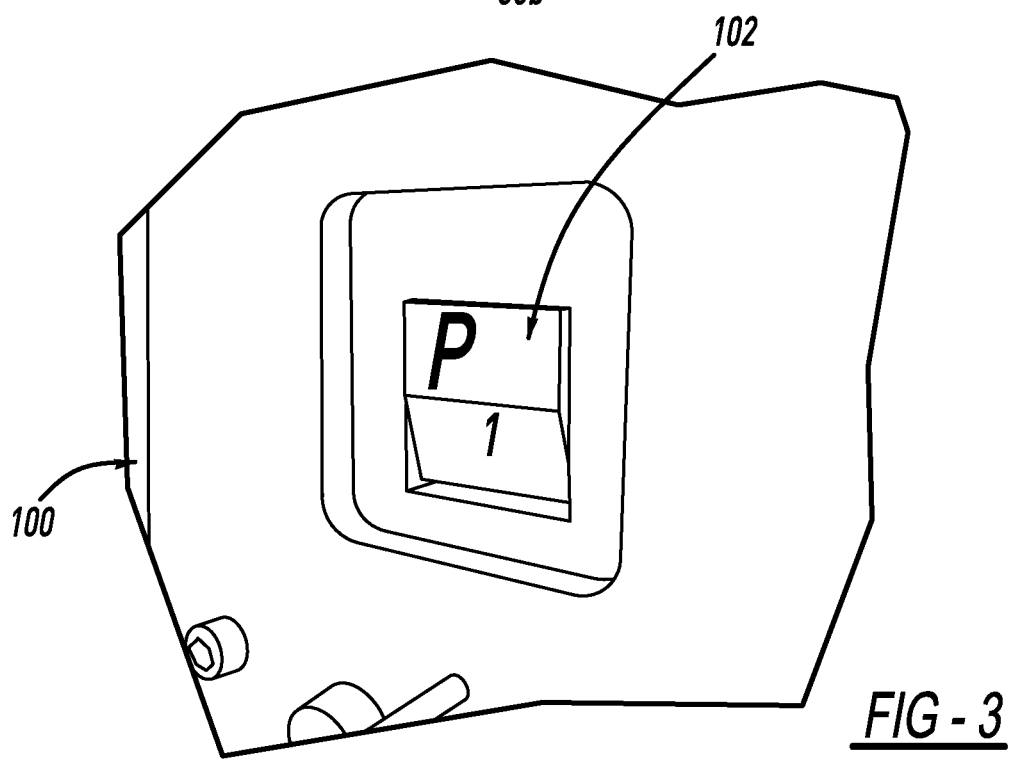

FIG. 3 illustrates a prior art block shear test fixture shown generally at 100 with a 28×28 mm sample that was tested until premature failure using the test method, DPPD20160419 (ASTM D4501, 28×28 mm, 1 mm/min). However, the failure was to the substrate, not the weld interface.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A test fixture for measuring the weld interface between thermoplastic composite substrates, comprising:
   a first lateral support block operably coupled to a first gripper, said first gripper having a first channel operably for holding a first substrate of a test sample;
   a second lateral support block parallel to the first lateral support block and operably coupled to a second gripper, said second gripper located lower than the first gripper and having a second channel operable for holding a second substrate of the test sample, said second substrate welded to the first substrate;
   a compression device that applies a load against a loading point of the first lateral support block.

2. The test fixture of claim 1, wherein the substrates are infrared welded or resistive implant welded or adhesive bonded.

3. The test fixture of claim 1, wherein at least one of the thermoplastic composite substrates is microcellular-foamed and has a low tensile strength of less than 25 Mpa.

4. The test fixture of claim 1, wherein the test fixture is a lap shear test fixture to determine the weld strength of the test sample, wherein the test sample is obtained from a production-ready part.

5. A method of testing the weld interface between composite substrates, comprising:
- providing a text fixture that is compact having two opposing blocks operably coupled to two grippers;
- providing a specimen having two substrates welded together;
- loading the specimen into the test fixture;
- applying a load to one of the two grippers;
- measuring the maximum load required to debond the weld interface between the two substrates.

6. The method of claim 5, wherein the welding is infrared welding or resistive implant welding or adhesive bonded.

7. The method of claim 5, wherein at least one of the substrates is a microcellular-foamed thermoplastic olefin substrate or fiber-reinforced thermoplastic composite.

8. The method of claim 5, wherein at least one of the substrates is has low tensile strength.

9. The method of claim 8, wherein the tensile strength is less than 25 MPa.

10. The method of claim 5, wherein the specimen is 20×25 mm and 3 mm thick.

11. The method of claim 5, wherein the distance between the two grippers is a maximum of 0.02 mm.

12. The method of claim 5, wherein the upper portion of each of the two blocks is 60×25 and 9 mm thick.

13. The method of claim 5, wherein the test is performed in compression-mode.

14. The method of claim 13, wherein the test is performed at a crosshead speed of 1 mm/min until the maximum load produced makes the weld interface between the two substrates fail in shear mode.

15. The method of claim 5, wherein the test is performed in accordance with DPPD20160419p (ASTM D4501 as reference, 25.4×20 mm, 1 mm/min).

16. The method of claim 5, further comprising cutting the specimen to 1.0 to 3.0 mm thick.

17. The method of claim 5, wherein no adhesive is used for the specimen.

18. The method of claim 5, wherein no adhesive curing is used for the specimen.

19. A compact test fixture for measuring weld interface between two microcellular-foamed thermoplastic composite substrates, comprising:
- a first lateral support block operably coupled to a first gripper retaining a first of the two microcellular-foamed thermoplastic composite substrates of a test sample that is welded in at least one predetermined location to a second of the two microcellular-foamed thermoplastic composite substrates of the test sample;
- a second lateral support block aligned with and spaced from the first lateral support block and operably coupled to a second gripper retaining the second substrate of the test sample; and
- a compression device operable to apply a load against a loading point of the first or second lateral support block, while the other of the first or second lateral support blocks has no direct load applied from the compression device, until a maximum load causes the weld interface between the two microcellular-foamed thermoplastic composite substrates to fail in shear mode.

20. The test fixture of claim 19, further comprising a first channel formed in the first gripper and a second channel formed in the second gripper, wherein the channels are aligned to hold the test sample prior to application of the load against the loading point and become unaligned when the maximum load makes the weld interface fail in shear mode.

* * * * *